United States Patent [19]

Isobe et al.

[11] Patent Number: 4,882,670

[45] Date of Patent: Nov. 21, 1989

[54] NUMERICAL CONTROL SYSTEM

[75] Inventors: Shinichi Isobe; Mitsuto Miyata; Takashi Yamauchi, all of Tokyo, Japan

[73] Assignee: Fanuc Ltd., Minamitsuru, Japan

[21] Appl. No.: 49,692

[22] PCT Filed: Aug. 21, 1986

[86] PCT No.: PCT/JP86/00432

§ 371 Date: Apr. 20, 1987

§ 102(e) Date: Apr. 20, 1987

[87] PCT Pub. No.: WO87/01215

PCT Pub. Date: Feb. 26, 1987

[30] Foreign Application Priority Data

Aug. 21, 1985 [JP] Japan .................................. 60-183563

[51] Int. Cl.[4] .................... G06F 15/16; G06F 15/46
[52] U.S. Cl. .................................. 364/188; 364/200;
364/228.1; 364/228.5; 364/134; 364/136;
364/474.11; 364/474.22
[58] Field of Search .................... 364/130–134,
364/136, 188, 189, 171, 474, 200, 900

[56] References Cited

U.S. PATENT DOCUMENTS

| 3,980,993 | 9/1976 | Bredart et al. | 364/200 |
| 4,149,235 | 4/1979 | Froyd et al. | 364/134 |
| 4,228,495 | 10/1980 | Bernhard et al. | 364/474 |
| 4,246,637 | 1/1981 | Brown et al. | 364/200 |
| 4,371,932 | 2/1983 | Dinwiddie, Jr. et al. | 364/200 |
| 4,543,627 | 9/1985 | Schwab | 364/200 |
| 4,570,217 | 2/1986 | Allen et al. | 364/188 |
| 4,628,422 | 12/1986 | Isoke et al. | 364/136 |
| 4,688,168 | 8/1987 | Gudaitis et al. | 364/134 |
| 4,716,516 | 12/1987 | DuLong | 364/132 |

Primary Examiner—John R. Lastova
Attorney, Agent, or Firm—Staas & Halsey

[57] ABSTRACT

The invention relates to a numerical control system equipped with a computerized man-machine interface controller (MMC unit) and including an NC unit (11), a programmable machine controller (13) for executing at least sequence control based on signals from the NC unit (11) and a machine tool (12), a computerized man-machine interface controller (14) having at least a CRT (14d) and a keyboard (14e), and a data exchange controller (15), wherein data are exchanged among the NC unit (11), programmable machine controller (13) and man-machine interface controller (14) under the control of the data exchange controller (15).

2 Claims, 5 Drawing Sheets

NUMERICAL CONTROL SYSTEM

BACKGROUND OF THE INVENTION

1. Field of the Invention

This invention relates to a numerical control system and, more particularly, to a numerical control system equipped with a computerized man-machine interface controller (MMC unit) having at least a CRT and a keyboard.

2. Description of the Related Art

In a numerical control system, a programmable machine controller (referred to as a "PMC unit") executes predetermined sequence control on the basis of a command from a numerical control unit (NC unit), whereby the various elements of a machine tool operate based on the results of sequence processing. The NC unit waits for the completion of machine element operation before executing the next numerical control operation. NC program data is obtained from an NC tape or memory or is inputted from a manual data input unit equipped with a CRT (which unit is referred to as a CRT/MDI unit).

In addition to having a function which allows NC data to be inputted manually, the CRT/MDI unit is adapted to display various pictures on the CRT screen, these including e.g. machine present position, program contents, offset quantities, parameters, the contents of alarms, setting data and the like, and to set, modify or reset various data by prescribed manipulation of keys on the keyboard.

FIG. 4 is a block diagram of a conventional numerical control system. Numeral 101 denotes an NC tape (or other medium) in which NC data are punched, 102 a tape reader, 103 a RAM for storing NC data and the results of processing, 104 a ROM storing a control program, 105 a processor, 106 an axis controller for executing pulse distribution calculations and the like upon receiving inputs of traveling distances along respective axes per predetermined periods of time, 107 a CRT/MDI, 108 an interface circuit, 109 a parameter memory, and 110 an EROM (erasable ROM) storing a sequence program. The single processor 105 of this numerical control system executes all of the following processing:

(1) numerical control processing based on NC program data;

(2) sequence control processing based on the sequence program; and (3) data input/output processing using the CRT/MDI unit 107.

For this reason, the processor is under a heavy load and is incapable of fine processing, processing with a quick response, and processing which is complicated.

Accordingly, as shown in FIG. 5, a numerical control system has been proposed in which the NC unit, PMC unit and CRT/MDI unit are separated from one another, a common memory is provided and various control operations are performed by an exchange of data among these units via the common memory.

In FIG. 5, numeral 1 denotes the NC unit, 2 the machine tool, 3 a PMC unit, 4 a CRT/MDI unit, 5 a servo unit, and 6 a data exchange controller having a common memory (RAM) 6a, bus controller 6b and serial transfer controller 6c.

The NC unit 1 has a processor 1a, ROM 1b, RAM 1c, NC data input/output unit 1d and axis controller 1e. The PMC unit 3 has a processor 3a, a ROM sequence program and software created by the user, a RAM 3c for storing the results of sequence processing in addition to parameters and various tables, a digital signal input unit 3d, a digital signal output unit 3e, and a serial transfer controller 3f.

The CRT/MDI unit 4 has a keyboard 4a, a CRT 4b, a keyboard controller 4c, a CRT controller 4d, and a serial transfer controller 4e.

FIG. 6 is a view showing the concept of the numerical control system illustrated in FIG. 5, in which portions similar to those of FIG. 5 are designated by like reference characters.

In accordance with this numerical control system, the NC unit 1 and PMC unit 3 are each provided with their own processors, so that the processor 1a need not execute sequence control. The makes it possible to reduce the burden on the processor.

Further, the side that transmits data writes the data and commands that are to be transmitted into the common memory 6a via the bus controller 6b. The side that receives the data reads the data addressed to it out of the common memory 6a, in which these data have been written. If processing is executed in this manner, the exchange of data can be controlled at high speed.

In addition, since the PMC unit 3 is provided with the processor 3a and is capable of exchanging data with the NC unit 1, control special to the maker can be performed, in addition to the conventional PMC function, by preparing the prescribed software and storing it in the ROM 3b. For example, predetermined control can be carried out upon receiving various data necessary for NC control, such as present positions along the respective axes or modal data, from the NC unit 1, or a non-volatile memory (not shown) such as a bubble memory connected to the NC unit can be utilized.

The PMC unit 3 is also capable of exchanging data with the CRT/MDI unit 4 via the data exchange controller 6. The PMC unit 3 therefore can (1) read data set by the keyboard 4a, and (2) display ladder diagram and the like on the CRT 4b.

FIG. 6 illustrates, in conceptual form, the previously proposed numerical control system depicted in FIG. 5 and shows that there is a strong relationship between the CRT/MDI unit 4 and the NC unit 1 or PMC unit 3. Consequently, it is necessary to design the NC unit and PMC unit upon taking the functions of the CRT/MDI unit into consideration. Hence, when a display function or control function peculiar to the CRT/MDI unit is required, a new NC unit or PMC unit must be designed each time. This is undesirable.

Furthermore, since the CRT/MDI unit does not possess an intelligent function, data must be processed on the side of the NC unit 1 or PMC unit 3, thereby increasing the burden on these sides. In the end, a CRT/MDI unit exhibiting fine control cannot be provided.

In addition, with the numerical control system of FIG. 5, there is a limitation on complicated processing, though the processing that can be executed is more complicated than with the system of FIG. 4. Specifically, automatic programming processing, full self-diagnostic processing, CRT instruction manual-type display processing and other forms of complicated processing cannot be executed.

SUMMARY OF THE INVENTION

Accordingly, an object of the present invention is to provide a numerical control system equipped with a man-machine interface controller (MMMC unit) having an intelligent function and using a CRT/MDI unit as an input/output unit.

Another object of the present invention is to provide a numerical control system which is easy to use, excellent in terms of human engineering and capable of diverse processing with a quick response.

A further object of the present invention is to provide a numerical control system which enables standardization of the NC unit and PMC unit irrespective of the functions possessed by the CRT/MDI unit.

The present invention relates to a numerical control system equipped with a computerized man-machine interface controller (MMC unit). The numerical control system according to the invention has an NC unit (11), a programmable machine controller (13) for executing at least sequence control based on signals from the NC unit (11) and a machine tool (12), a computerized man-machine interface controller (14) having at least a CRT (14d) and a keyboard (14e), and a data exchange controller (15), data being exchanged among the NC unit (11), programmable machine controller (13) and man-machine interface controller (14) under the control of the data exchange controller (15).

In accordance with the invention, processing is dispersed to lighten the load on the processor of the NC unit. In addition, since the MMC unit is capable of program processing, multifarious, fine control can be carried out. Furthermore, since each unit can be placed in modular form and the modules combined to construct the system, the architecture of the system is facilitated. Moreover, each unit can be standardized irrespective of the functions of the other units. The processors are also capable of performing simultaneous, concurrent processing, so that system function can be greatly improved.

DESCRIPTION OF THE PREFERRED EMBODIMENTS

Figure 1:
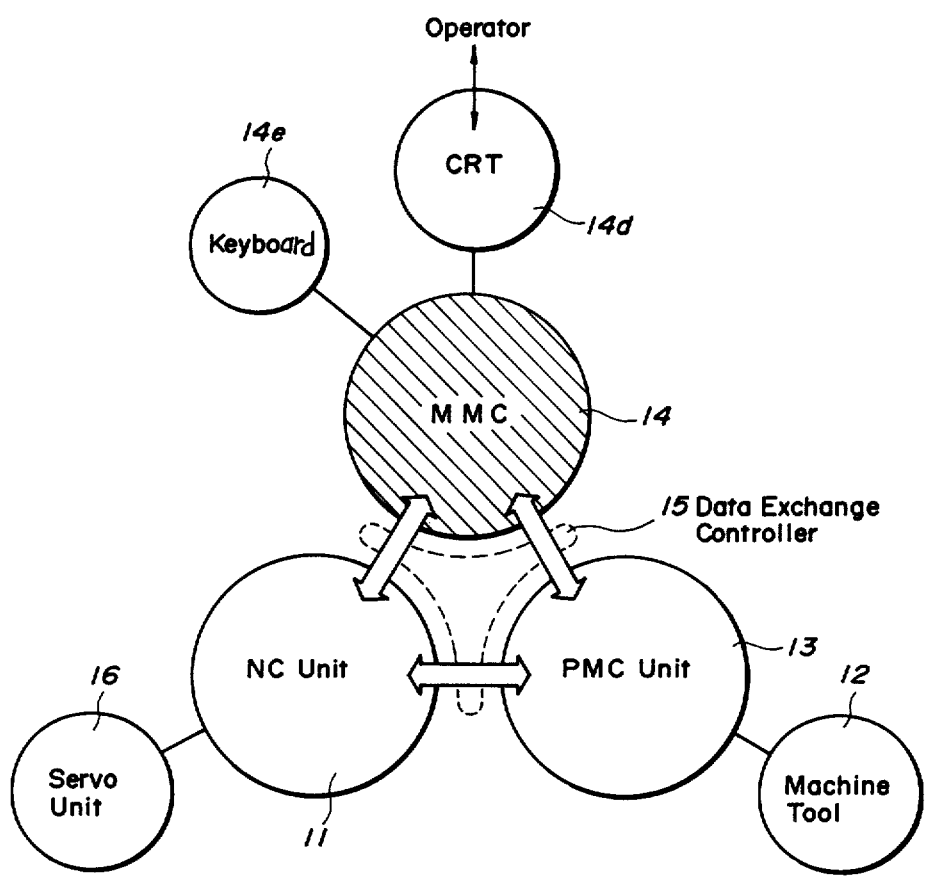
FIG. 1 is a view showing the concept of a numerical control system according to the present invention.

FIG. 1 is a view showing the concept of a numerical control system according to the present invention.

Numeral 11 denotes a computerized NC unit (CNC unit), 12 a machine tool, 13 a PMC unit, 14 a man-machine interface controller (MMC unit), 15 a data exchange controller, and 16 a servo unit. The MMC unit 14 is constituted by a computer and has at least a CRT 14d and a keyboard 14e.

If a CRT/MDI unit is provided with an intelligent function, or in other words, if a computerized interface including a keyboard and CRT unit is prepared and the interface is provided with program processing functions, e.g. the functions possessed by the conventional CRT/MDI unit, an editing function, an automatic programming function and the like, the interface will be easy to use, excel in terms of human engineering and be capable of quick-response, diverse processing. It will also be possible to standardize the NC unit and PMC unit regardless of the CRT/MDI functions.

Accordingly, in the present invention, the numerical control system is constituted by the NC unit 11, the programmable machine controller (PMC unit) for executing sequence control and the like based on signals from the NC unit or machine tool 12, the computerized man-machine interface controller (MMC unit) 14 having the CRT 14d and keyboard 14e, and the data exchange controller 15, with a data exchange being performed among the NC unit 11, PMC unit 13 and MMC unit 14 via the data exchange controller 6.

Figure 2:
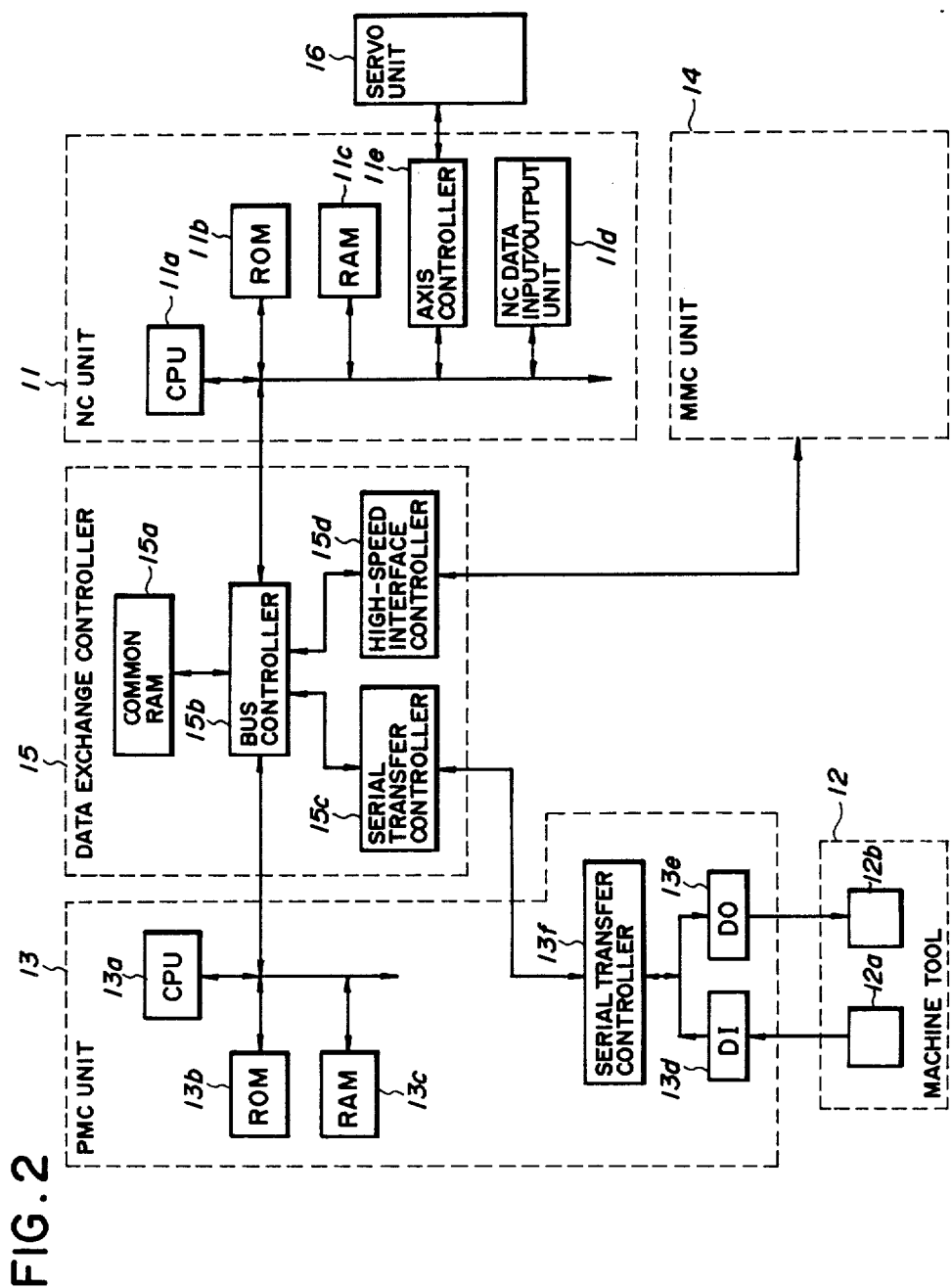
FIG. 2 is a block diagram of the numerical control system according to the present invention.

FIG. 2 is a block diagram of the numerical control system according to the invention, in which numeral 11 denotes the computerized NC unit (CNC unit), 12 the machine tool, 13 the PMC unit, 14 the man-machine interface controller (MMC unit), 15 the data exchange controller, and 16 the servo unit.

The NC unit 11 has a processor 11a, ROM 11b, a RAM 11c, an NC data input/output unit 11d, and an axis controller 11e.

The PMC unit 13a has a processor 13a, a ROM 13b storing a sequence program and software created by the user, a RAM 13c for storing the results of sequence processing in addition to parameters and various tables, a digital signal input unit 13d and digital output unit 13e for performing an exchange the machine tool 12, and a serial transfer controller 13f. The serial transfer controller 13f is composed of a buffer, parallel-serial/serial-parallel converter, transceiver and the like, none which are shown. Signals from switches 12a of the machine tool 12 are inputted to the digital signal input unit 13d in parallel fashion, and data from the digital signal output unit 13e are outputted to relays and solenoids 12b of the machine tool 12 in parallel fashion.

Figure 3:
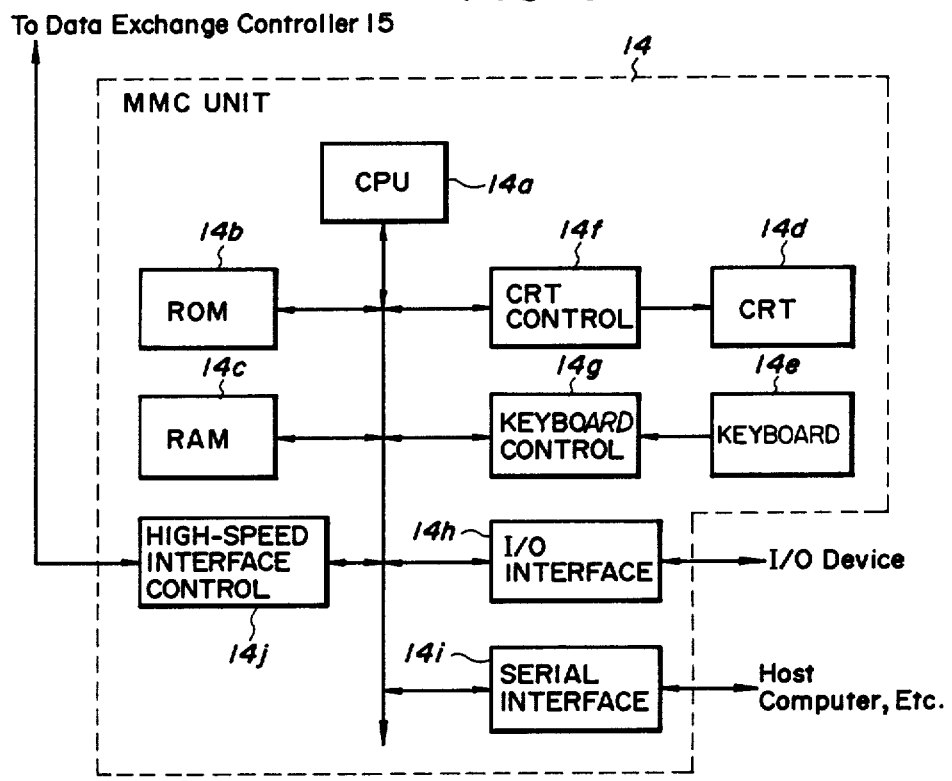
FIG. 3 is a block diagram showing a man-machine controller (MMC unit) in the numerical control system according to the present invention.
Figure 6:
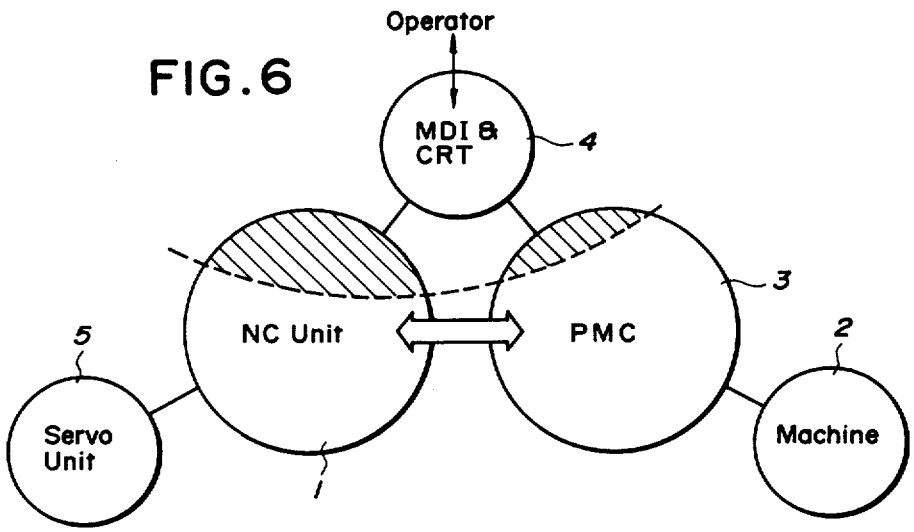
FIG. 6 is a view showing the concept of the numerical control system of FIG. 5.
Figure 4:
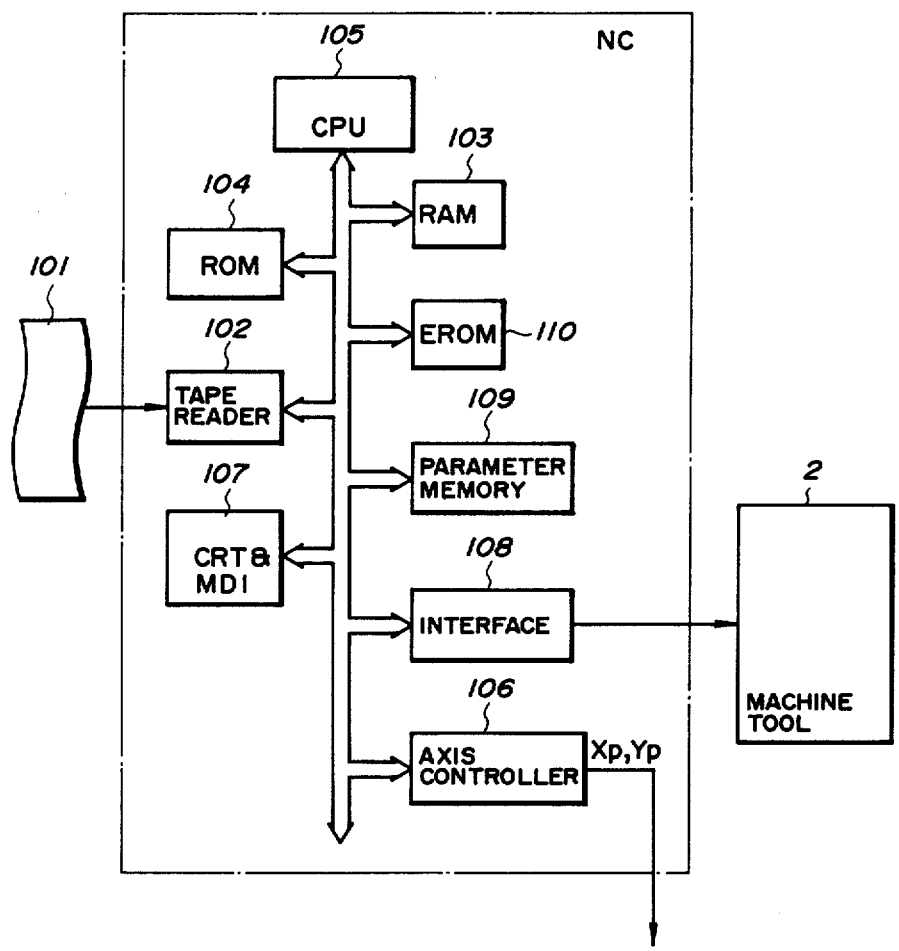
FIG. 4 is a block diagram of the conventional numerical control system.

As shown in FIG. 3, the MMC unit 14 includes a processor 14a, a ROM 14b, a RAM 14c, the CRT 4d, the keyboard 14e, a CRT controller 14f, a keyboard controller 14g, an I/O interface 14h for performing a data exchange with an I/O data bus, not shown, a serial interface 14i for performing a data exchange with a host computer, and a high-speed interface controller 14j having a built-in processor for performing a high-speed exchange of data with a high-speed interface controller 15d of the data exchanger controller 15 in conformance with an HDLC (high-level data link control) procedure.

The data exchange controller 15 has a common memory 15a of RAM construction, a bus controller 15b, a serial transfer controller 15c of the same construction as the serial transfer controller 13f of the PMC unit 13 for performing an exchange of data therewith, and the high-speed interface controller 15d oft the same construction as the high-speed interface controller 14j of the MMC unit 14 for performing an exchange of data therewith.

Figure 5:
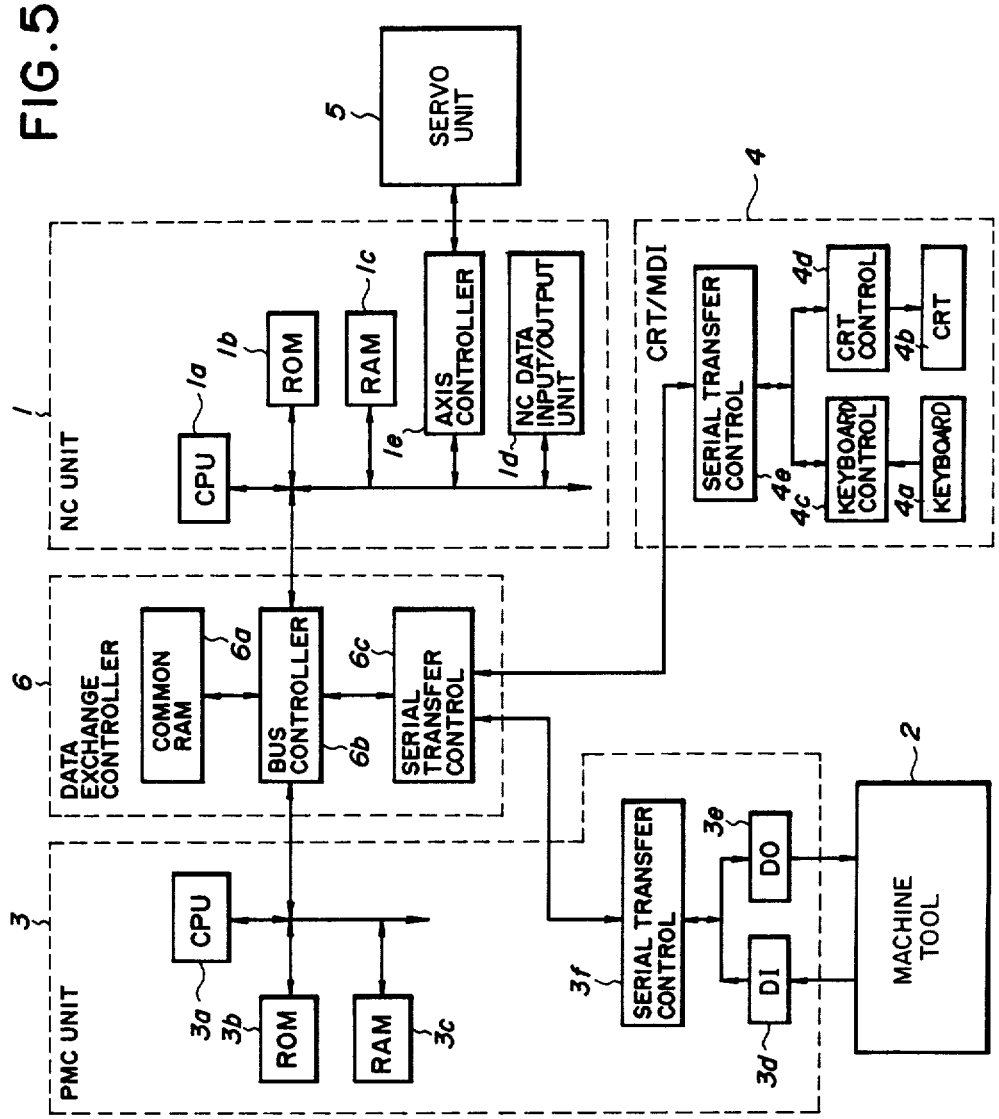
FIG. 5 is a block diagram illustrating a proposed numerical control system.

The exchange of data between the NC unit 11 and PMC unit 13 is performed just as in the system shown in FIG. 5. That is, the sending side writes data and commands into the common RAM 15a, and the receiving side reads these the data and commands. On the other hand, the exchange of data between the NC unit 11 or PMC unit 13 and the MMC unit 14 is performed via the high-speed interface controllers 14j, 15d. More specifically, if the NC unit 11 or PMC unit 13 is the sending side, transmission is performed by writing the data and commands in the common RAM 15a and having the high-speed interface controller 15d with the built-in processor read these data and commands and transmit them to the high-speed interface controller 14j on the MMC unit side. If the MMC unit 14 is to make a transmission to the NC unit 11 or PMC unit 13, this is performed by transmitting the data and commands from the high-speed interface controller 14j to the high-speed interface controller 15d on the side of the data exchange controller 15 and having the high-speed interface controller 15d write these data and commands in the common RAM 15a.

In accordance with the invention, the MMC unit 14 is computerized and adapted so as to be capable of executing program processing. Therefore, the processor 14a of the MMC unit, the processor 11a of the NC unit 11 and the processor 13a of the PMC unit 13 construct a multiprocessor system. As a result, processing is decentralized to lighten the processing load.

Further, the MMC unit 14 is capable of program processing and can store data. It is therefore capable of multifarious, fine control which can be carried out with excellent controllability, safety and ease of maintenance. For example, automatic programming processing, guidance display processing like that of an instruction manual, sophisticated self-diagnostic processing and other forms of processing can be executed, and it is possible to fabricate a man-machine interface conforming to the machine.

Furthermore, since each of the units 11, 13, 14 can be placed in modular form and the modules combined to construct the numerical control system, the architecture of the system is facilitated. Moreover, each unit can be standardized irrespective of the functions of the other units.

The processors are also capable of performing simultaneous, concurrent processing, so that system function can be greatly improved.

We claim:

1. A numerical control system, comprising:
    an NC unit;
    a programmable machine controller for executing at least sequence control based on signals from the NC unit and a machine tool;
    a computerized man-machine interface controller having at least a computer, a CRT connected to the computer and a keyboard connected to the computer; and
    a data exchange controller connected to said NC unit, said machine controller and the computer of said interface controller, and data being exchanged among the NC unit, programmable machine contoller and man-machine interface controller under the control of said data exchange controller;
    wherein both said NC unit and said programmable machine controller include computers; and
    wherein said machine controller includes a bus, said NC unit includes a bus, and said data exchange controller has a common RAM, a high-speed interface controller, and a bus controller connected, for bidirectional data exchange with said common RA, said high-speed interface controller, the bus of said programmable machine controller, and the bus of said NC unit; and said man-machine interface controller having a high-speed interface controller connected to the high-speed interface controller of the data exchange controller and connected to the computer of said interface controller.

2. A numerical control system connected to an external I/O device and an external computer and comprising:
    an NC unit;
    a programmable machine controller for executing at least sequence control based on signals from the NC unit and a machine tool;
    a computerized man-machine interface controller having at least a computer, a CRT connected to the computer and a keyboard connected to the computer; and
    a data exchange controller to said NC unit, said machine controller and the computer of said interface controller, and data being exchanged among the NC unit, programmable machine controller and man-machine interface controller under the control of said data exchange controller;
    wherein both said NC unit and said programmable machine controller include computers; and
    wherein said man-machine interface controller has an I/O interface connected to the external I/O device and a serial interface connected to the external computer.

* * * * *

UNITED STATES PATENT AND TRADEMARK OFFICE
CERTIFICATE OF CORRECTION

PATENT NO. : 4,882,670
DATED : NOVEMBER 21, 1989
INVENTOR(S) : SHINICHI ISOBE ET AL.

It is certified that error appears in the above-identified patent and that said Letters Patent is hereby corrected as shown below:

Col. 1, line 68, "ROM sequence" should be --ROM 3b storing a sequence--.

Col. 2, line 16, "control. The" should be --control, which--.

Col. 3, line 5, "MMMC" should be --MMC--.

Col. 4, line 34, "exchange the" should be --exchange of data with the--;
   line 60, "oft" should be --of--.

Col. 6, line 20, "RA" should be --RAM--;
   line 39, "controller to" should be --controller connected to--.

Signed and Sealed this

Twenty-third Day of April, 1991

Attest:

HARRY F. MANBECK, JR.

*Attesting Officer*  Commissioner of Patents and Trademarks